United States Patent
Cognevich et al.

[11] Patent Number: 5,738,333
[45] Date of Patent: Apr. 14, 1998

[54] RELIEF VALVE

[75] Inventors: Michael L. Cognevich; Neal Murray, both of Hamburg, N.Y.

[73] Assignee: Flow Safe, Inc., Orchard Park, N.Y.

[21] Appl. No.: 662,691

[22] Filed: Jun. 13, 1996

[51] Int. Cl.[6] ................................... F16K 31/45
[52] U.S. Cl. .................. 251/61.2; 251/86; 251/88; 137/489.5
[58] Field of Search ................ 137/489, 489.5; 251/86, 88, 61.2

[56] References Cited

U.S. PATENT DOCUMENTS

| | | | |
|---|---|---|---|
| 2,398,089 | 4/1946 | Fehr | 251/86 |
| 2,599,979 | 6/1952 | Drane. | |
| 2,631,606 | 3/1953 | Parks | 137/489 |
| 2,740,425 | 4/1956 | Garland | 251/86 |
| 3,477,456 | 11/1969 | Powell. | |
| 3,722,852 | 3/1973 | Powell et al.. | |
| 3,945,302 | 3/1976 | Downs | 251/61.2 |
| 4,425,938 | 1/1984 | Papa | 137/489 |
| 4,586,533 | 5/1986 | Estes. | |
| 4,609,008 | 9/1986 | Anderson, Jr. et al.. | |
| 4,674,530 | 6/1987 | Bickford. | |
| 4,705,065 | 11/1987 | McNeely et al.. | |
| 5,333,635 | 8/1994 | Higgins et al.. | |
| 5,511,581 | 4/1996 | Ligh | 137/489 |

OTHER PUBLICATIONS

"Brochure of A.G. Marvac Ltd., Warrington, England, 5 pages". (Date Unknown).

*Primary Examiner*—Denise L. Ferensic
*Assistant Examiner*—Ramyar Farid
*Attorney, Agent, or Firm*—Bush, Riddle, & Jackson L.L.P.

[57] ABSTRACT

A pressure relief valve (10) for a pilot operated fluid system (FIG. 4) for a pressure vessel (12). Pressure relief valve (10) has a valve body (14) forming a valve chamber (16) accessible by upper cover plate (24). A cylindrical housing (32) is mounted in the valve chamber (16). A valve stem (38) has a diaphragm assembly (40) on its upper end and a valve assembly (42) on its lower end. Diaphragm assembly (40) includes a rolling loop diaphragm (44) fitting between opposed surfaces (36, 60) of housing (32) and piston member (56). A circular guide (66) on valve stem (38) fits within housing (32) for guiding the movement of the valve stem (38). Valve assembly (42) is connected to valve stem (38) about a ball and socket joint formed by ball (70) on the valve stem (38) and a socket (84) on the valve assembly (42).

4 Claims, 3 Drawing Sheets

RELIEF VALVE

BACKGROUND OF THE INVENTION

1. Field of the Invention

This invention relates to a relief valve, and more particularly to a low pressure relief valve for a pressure vessel in a pilot operated fluid system.

2. Description of Prior Art

A pilot operated fluid pressure relief system for a pressure vessel, or conduit, such as a tank or fluid conduit, includes a main relief valve and a pilot valve which uses the pressure of the pressure vessel to hold the relief valve in a closed position from a dome chamber over the main relief valve. The pilot valve continuously senses the pressure in the pressure vessel. The main relief valve normally has a diaphragm defining the dome chamber of a greater fluid pressure area than the seat sealing area of the main valve member in order to maintain the main valve member in a closed seated position under normal operating pressures. When the pressure in the pressure vessel increases to set pressure, the pilot valve opens to reduce the pressure in the dome chamber, and the main relief valve member opens to discharge fluid from the pressure vessel.

When the pressure in the pressure vessel decreases below a predetermined pressure, the pilot valve closes and the pressure in the dome chamber increases for reseating of the main relief valve.

Prior pilot operated fluid systems are illustrated in U.S. Pat. No. 3,477,456 dated Nov. 11, 1969; U.S. Pat. No. 4,586,533 dated May 6, 1986; and U.S. Pat. No. 4,609,008 dated Sep. 2, 1986.

Certain low pressure main relief valves in pilot operated fluid systems have been provided in the prior art which operate at fluid pressures below about five (5) pounds per square inch gauge (5 psig) and as low as about eight (8) inches water column (WC). Such low pressure relief valves are required to unseat and seat at precise low pressures in order to function accurately. It is desired that the weight of the relief valve and friction generated by moving members of the relief valve be minimized. Bubble tight sealing of the relief valve is normally required at such low fluid pressures.

IDENTIFICATION OF OBJECTS OF INVENTION

Precise guided movement of the main relief valve member in a longitudinal direction is desired between open and closed positions with minimal friction generated during such movement in order to maintain the opening and closing of the main valve member at precise low pressures.

The annular fixed seat member about the fluid inlet and the mating movable seat of the main relief valve must seal accurately in order to provide bubble tight sealing.

A movable seat supported from an articulated connection is desired for precise sealing against the fixed seat member, which may not be exactly flat.

SUMMARY OF THE INVENTION

The present invention is embodied in a low pressure main valve of a pilot operated relief valve system in which a pilot valve controls the opening and closing of the relief valve. The main valve body has an upper cover which is removable to provide access to the main body chamber or cavity in which the internal relief valve structure and fixed annular seat may be easily inserted.

The internal valve structure within the main valve body includes an outer cylindrical housing or liner. A valve stem is mounted in the cylindrical housing with a seat assembly mounted on its lower end and a diaphragm assembly mounted on its upper end. The seat assembly is connected about a ball and socket joint to the valve stem. A circular guide is secured to the valve stem adjacent the ball and socket joint and is received within the cylindrical housing to guide the valve stem in an axial direction during movement of the valve stem between open and closed positions of the relief valve. The lower end of the seat assembly includes an elastomeric seat member which seals against a fixed metal valve seat about the fluid inlet for the relief valve. The fixed valve seat comprises an externally threaded annular sleeve threaded within the valve body about the inlet with an annular metal seat member on the upper end of the sleeve for bubble tight sealing contact against the elastomeric seat member of the moveable seat assembly. The fixed metal seat member has an upper edge characterized by a small radius to seal against the elastomeric seat member in the closed position of the relief valve.

An important feature of the low pressure relief valve of the invention includes a diaphragm assembly secured to the upper end of the valve stem. The diaphragm assembly includes a rolling loop diaphragm mounted between the cylindrical housing and a concentric cylindrical clamping or piston member on the valve stem for securing the central portion of the diaphragm. The rolling loop rolls along the opposed closely spaced concentric surfaces on the cylindrical housing and cylindrical piston member during movement of the relief valve between open and closed positions. Friction is minimized by the rolling loop during such movement. The rolling loop also aids in guidance of the valve stem during longitudinal movement thereof. A circular guide on the lower end of the valve stem is received within the housing for further guiding the valve stem.

Other features and advantages of this invention will be more apparent after referring to the following specification and drawings.

DESCRIPTION OF THE INVENTION

Figure 1:
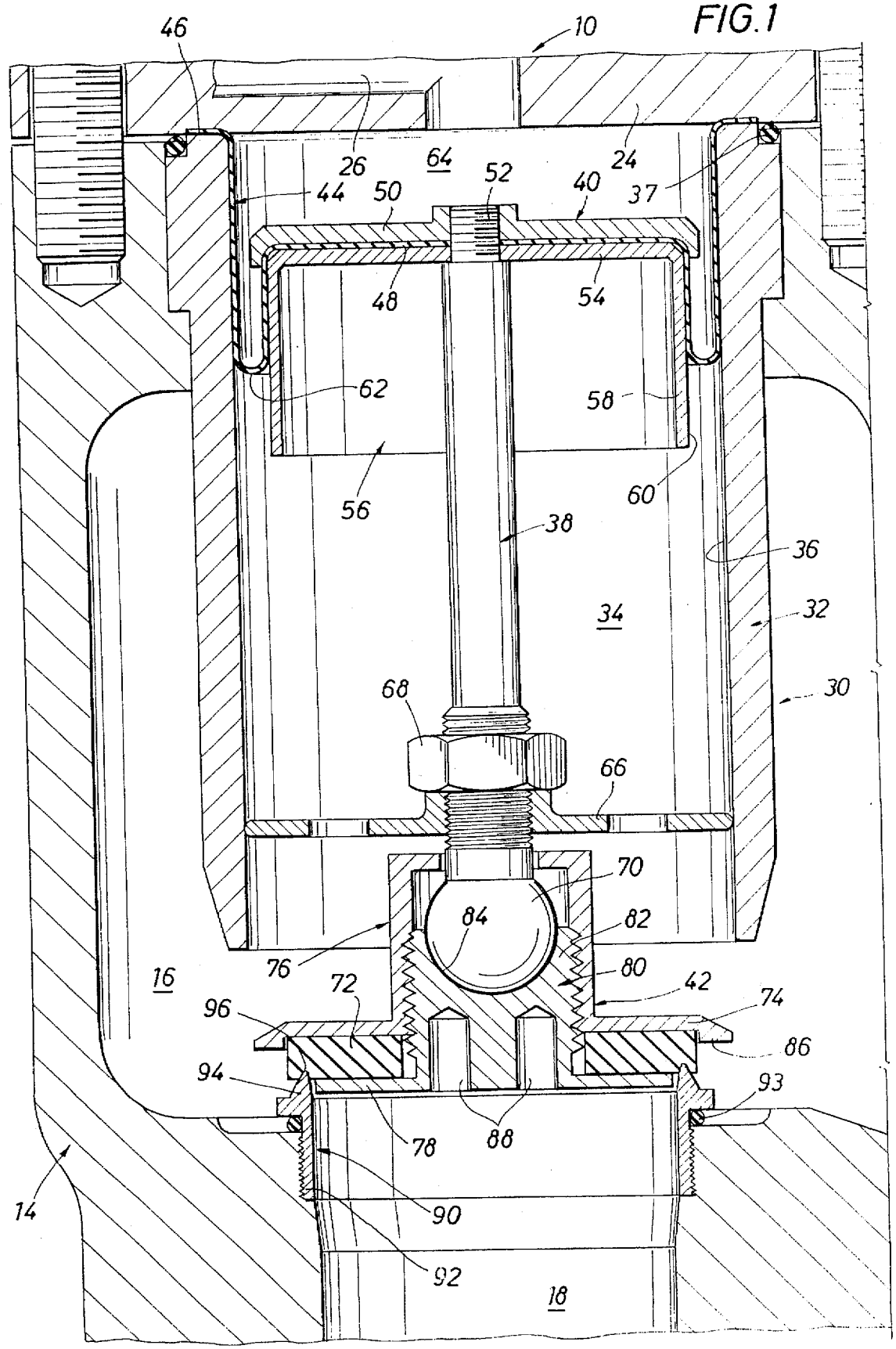
FIG. 1 is an enlarged sectional view of a low pressure main relief valve of the present invention with the valve shown in a closed position.
Figure 2:
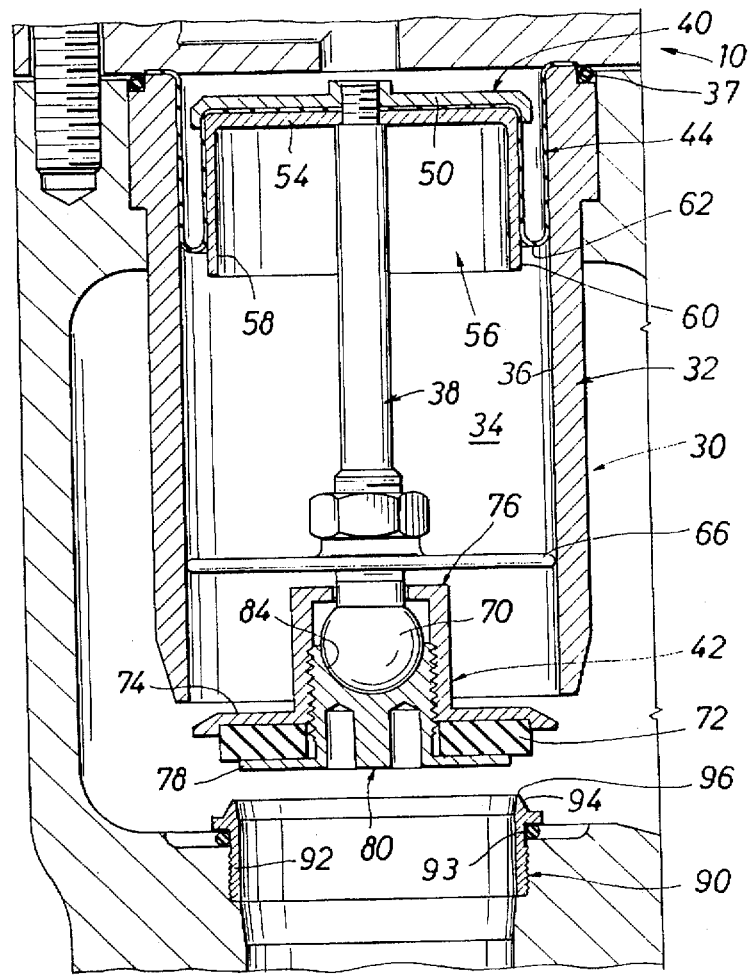
FIG. 2 is a sectional view of a portion of FIG. 1 but showing the main relief valve in an open position.
Figure 4:
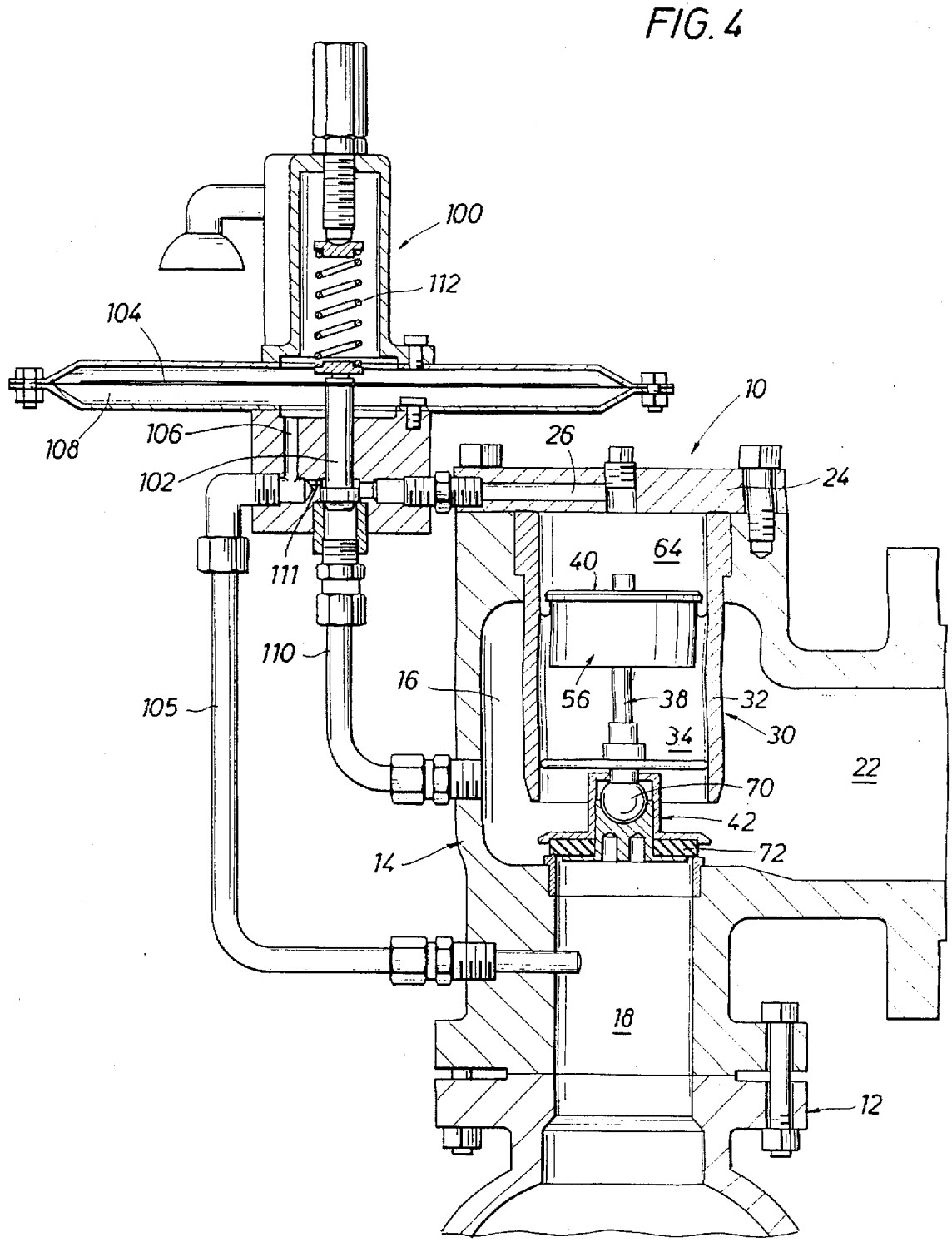
FIG. 4 is a sectional view, partly schematic, showing the relief valve of the present invention in a pilot operated fluid system.

Referring now to the drawings for a better understanding of this invention, and more particularly to FIGS. 1 and 2, an improved safety relief valve is shown generally at 10 adapted for use in a pilot operated fluid relief system for a pressure vessel shown generally at 12 (see FIG. 4). Pressure vessel 12 may comprise a tank or a fluid conduit, for example. Relief valve 10 has a main body 14 forming a main valve chamber 16, a fluid inlet 18, and a fluid outlet 22. Fluid inlet 18 is in continuous fluid communication with pressure vessel 12. Fluid outlet 22 receives the relieved fluid from valve chamber 16 upon opening of relief valve 10 for venting, transport or collection of the fluid relieved from pressure vessel 12. An upper cover plate 24 is removably mounted on body 14 over valve chamber 16 and has a laterally extending fluid passage 26 therein.

An internal relief valve structure or valve assembly is shown generally at 30 and is mounted within valve chamber 16. Valve assembly 30 may be inserted within valve chamber 16 upon removal of cover plate 24. Valve assembly 30 includes a cylindrical housing 32 which has a central bore 34 therethrough defined by an inner peripheral surface 36. An annular seal 37 seals between housing 32 and cover plate 24. Mounted within cylindrical housing 32 is an elongated valve stem 38 having a diaphragm assembly 40 on an upper end thereof and a seat assembly 42 on its lower end. Diaphragm assembly 40 includes a rolling diaphragm generally indicated at 44 having an outer marginal portion 46 sandwiched between cover plate 24 and housing 32. A central portion 48 of diaphragm 44 is secured between an upper plate 50 threaded onto an externally threaded end portion 52 of valve stem 38 and an outer end 54 of an inverted cup-shaped piston member 56 fitting about end portion 52. Piston member 56 is mounted generally in coaxial relation to housing 32 and has a cylindrical skirt 58 defining an outer surface 60 which extends generally coaxially with inner surface 36 of housing 32. Diaphragm 44 includes a rolling loop 62 which follows parallel surfaces 36 and 60 during axial movement of valve stem 38. A dome chamber 64 formed between diaphragm 44 and cover 24 is in fluid communication with fluid passage 26 to a pilot valve.

A circular guide 66 is mounted on valve stem 38 by nut 68 and is received within housing 32 for engaging inner surface 36 of housing 32 and guiding axial movement of guide stem 38. The lower end of guide rod or stem 38 includes a ball 70. Seat assembly 42 is mounted on ball 70 for relative articulated movement about three hundred and sixty (360) degrees. Seat assembly 42 includes an annular elastomeric seat 72 clamped between an outer flange 74 of an upper hollow hat-shaped member 76 and a lower flange 78 of an inner hat-shaped member generally indicated at 80. Hat-shaped member 80 has a neck 82 which is threaded within upper hollow hat-shaped member 76 for gripping elastomeric seat 72 between flanges 74 and 78. Neck 82 has an upper socket 84 which mates with ball 70 to permit articulated movement of seat assembly 42 relative to valve stem 38. Upper flange 74 has an outer marginal flange portion 86 extending laterally beyond elastomeric seat 72 and downwardly alongside seat 72 for radially retaining elastomeric seat 72 in gripping relation between flanges 74 and 78. A pair of blind openings 88 in neck 82 permit adjustment of lower hat-shaped member 80 by receiving prongs of a suitable tool (not shown) for rotation of hat-shaped member 80 as desired.

Figure 3:
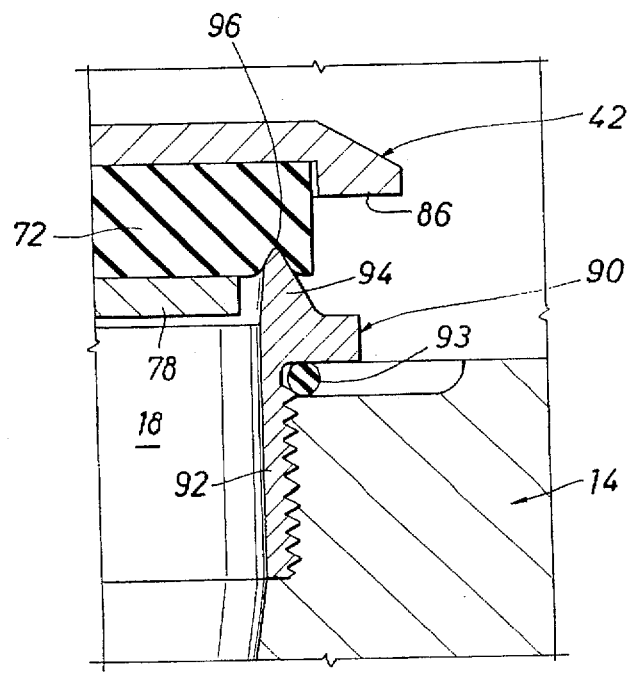
FIG. 3 is an enlarged fragment of FIG. 1 showing the fixed lower metal seat about the fluid inlet and the upper mating elastomeric seat in a closed position of the relief valve.

As shown particularly in FIG. 3, a fixed metal seat shown indicated at 90 includes an externally threaded sleeve 92 which is threaded within valve body 14 about fluid inlet 18. An annular seal 93 seals between valve body 14 and seat 90. A seat member 94 on the upper end of sleeve 92 has an upper edge 96 characterized by a relatively small radius for contacting and deforming the adjacent elastomeric seat 72 to provide a high unit loading. Seat member 94 provides a bubble tight seal at pressures as low as eight (8) inches water column (WC). Lower flange 78 is of a diameter less than the inner diameter of seat member 94 and is received within seat 90 in the closed seated position of elastomeric seat 72. Fixed metal seat member 94 is preferably formed of stainless steel and polished to remove any scratches. Elastomeric seat 72 is formed of nitrile rubber or neoprene, for example.

Relief valve 10 is particularly adapted for use at low pressures between about eight (8) inches WC and about five (5) pounds per square inch gauge (psig). Rolling diaphragm 44 between coaxial surfaces 36 and 60 minimizes friction as relief valve 10 cycles between open and closed positions. Seat assembly 42 mounted on ball 70 for relative movement permits elastomeric seat 72 to match and align with fixed metal seat member 94. Circular guide 66 produces substantially uniform movement of valve stem 38 in an axial direction. Fixed seat 90 is easily accessible for repair or replacement if desired.

Relief valve 10 is particularly adapted for use in a pilot operated fluid relief system as illustrated in FIG. 4. A pilot valve is shown generally at 100. Pilot valve 100 has a piston valve member 102 secured at its upper end to a diaphragm 104. Piston valve member 102 seats at its lower end in closed position as shown in FIG. 4. An inlet sensing line 105 extends from fluid inlet 18 to pilot valve 100. A fluid passage 106 communicates inlet fluid pressure to lower diaphragm chamber 108. A suitable orifice 111 permits fluid communication between inlet line 105 and dome line 26 in the closed position of piston valve member 105 for pressurizing dome chamber 64. An exhaust line 110 extends between the lower end of pilot valve 100 and main valve chamber 16 of relief valve 10. The piston assembly including piston 56 and rolling diaphragms 44 is designed particularly to provide a minimum weight and friction to permit full opening and full flow of relief valve 10 at a ten (10) percent overpressure.

Pilot valve 100 has an adjustable spring 112 for seating piston valve member 102 under a predetermined load by adjustment of spring 112 as desired. Fluid pressure from dome 64 is communicated through passage 26 in cover plate 24 to pilot valve member 100. In the closed position of piston valve 102, dome chamber 64 is not in fluid communication with exhaust line 110. In the open position of piston valve member 102, dome chamber 64 is in fluid communication with exhaust line 110 and orifice 111 is blocked. Sensing line 105 is in continuous fluid communication with inlet 18 and lower diaphragm chamber 108.

In operation, upon an increase in fluid pressure in sensing line 105 from pressure vessel 12, fluid pressure is communicated to lower diaphragm chamber 108 through passage 106. Diaphragm 104 lifts and unseats piston valve member 102 to provide fluid communication between dome chamber 64 and exhaust line 110 through dome line 26 thereby lowering fluid pressure in dome chamber 64. Reduction in fluid pressure in dome chamber 64 effects opening of main relief valve 10 as well known. Upon a reduction of fluid pressure in pressure vessel 12 and in lower diaphragm chamber 108, piston valve member 102 returns to seated closed position to block the exhaust of fluid from dome chamber 64 through line 110 and to assist in closing of main relief valve 10. Dome chamber 64 is repressurized from line 105 and orifice 111 in the closed position of piston valve member 102.

While a preferred embodiment of the present invention has been illustrated in detail, it is apparent that modifications and adaptations of the preferred embodiment will occur to those skilled in the art. However, it is to be expressly understood that such modifications and adaptations are in the spirit and scope of the present invention as set forth in the following claims.

What is claimed is:

1. A pilot operated relief valve for operation at low fluid pressures comprising:

a valve body having a main valve chamber, an outlet, and a fluid inlet;

a fixed annular seat about said fluid inlet;

a separate cylindrical housing mounted on said body within said valve chamber and having an axially extending bore therethrough;

an elongated valve stem mounted within said housing along the longitudinal axis of said housing having a diaphragm assembly mounted on its outer end and a seat assembly mounted at its opposite inner end; said seat assembly including an inner seat member for seating on said fixed seat about said fluid inlet in sealing relation in a closed position; said diaphragm assembly including inner and outer sandwiching members secured to the outer end of said stem for termination of said stem thereat and a diaphragm secured between said sandwiching members; said inner sandwiching member defining a piston member mounted within said housing for reciprocal movement;

an outer cover plate removably mounted on said valve body over said valve chamber and said cylindrical housing to removably secure said housing within said valve body;

a dome chamber between said outer cover plate and said piston member; and a pilot valve in fluid communication with said dome chamber for the exhaust and supply of fluid to said dome chamber for effecting movement of said piston member;

said diaphragm having an outer marginal portion thereof secured between said cover plate and said cylindrical housing and including an unsecured portion between said sandwiching members and securement of said outer marginal portion by said cover plate and said housing, said unsecured portion comprising a rolling loop which follows an inner surface of said housing upon movement of said valve stem and piston member between open and closed positions of said seat assembly for assisting in guiding said valve stem during movement thereof; and a circular plate guide threaded on said valve stem between said diaphragm assembly and said seat assembly for movement therewith, said plate guide having a diameter greater than said piston member and received within said cylindrical housing for contacting an inner surface of said cylindrical housing during movement of said valve stem to guide said valve stem and piston member in an axial direction.

2. A relief valve as set forth in claim 1 wherein:

an articulated connection joins said seat assembly to said valve stem;

a pair of seat mounting members including an inner mounting member and an outer mounting member which sandwich said inner seat member; and means for coupling said opposed seat mounting members to each other for providing relative axial pinching movement toward and away from said inner seat member.

3. A relief valve as set forth in claim 2 wherein:

said articulated connection comprises a ball and socket joint;

said inner seat member is formed of an elastomeric material; and said outer seat mounting member is a hat-shaped internally threaded mounting member secured to said valve stem to define a laterally extending annular flange, said inner seat mounting member having an externally threaded neck threaded within said hat-shaped internally threaded outer mounting member in mating relation and having a socket to receive a ball on said valve stem.

4. A relief valve as set forth in claim 3 wherein:

said inner mounting member is received within said fixed annular seat in the closed seated position of said elastomeric seat member, and said outer hat-shaped mounting member extends laterally over said fixed seat in said closed seated position of said elastomeric seat member.

\* \* \* \* \*